US008457184B2

(12) United States Patent
Chappaz (10) Patent No.: US 8,457,184 B2
(45) Date of Patent: Jun. 4, 2013

(54) METHOD AND APPARATUS FOR PERFORMING LOG-LIKELIHOOD CALCULATIONS

(75) Inventor: David F. Chappaz, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 260 days.

(21) Appl. No.: 12/933,080

(22) PCT Filed: Mar. 17, 2009

(86) PCT No.: PCT/GB2009/000721
§ 371 (c)(1),
(2), (4) Date: Sep. 16, 2010

(87) PCT Pub. No.: WO2009/115795
PCT Pub. Date: Sep. 24, 2009

(65) Prior Publication Data
US 2011/0019726 A1    Jan. 27, 2011

(30) Foreign Application Priority Data

Mar. 18, 2008  (GB) .................................. 0805054.4

(51) Int. Cl.
*H04B 3/46* (2006.01)
(52) U.S. Cl.
USPC ............................. 375/224; 714/794; 375/261
(58) Field of Classification Search
None
See application file for complete search history.

(56) References Cited

U.S. PATENT DOCUMENTS

| 8,166,379 B1* | 4/2012 | Wu et al. ........................ 714/794 |
| 2002/0159535 A1* | 10/2002 | Agami et al. .................. 375/261 |
| 2008/0285685 A1 | 11/2008 | Chang |
| 2008/0291888 A1* | 11/2008 | Maret et al. ................... 370/342 |
| 2009/0231028 A1* | 9/2009 | Wang et al. .................... 329/304 |

FOREIGN PATENT DOCUMENTS

| EP | 1 246 419 A1 | 10/2002 |
| EP | 1 843 534 A2 | 10/2007 |
| GB | 2 447 080 A | 1/2007 |
| KR | 20070061283 A | 6/2007 |
| WO | 02/056567 A2 | 7/2002 |
| WO | 03/007529 A1 | 1/2003 |

OTHER PUBLICATIONS

International Search Report and Written Opinion mailed Nov. 27, 2009, in corresponding International Application No. PCT/GB2009/000721, filed Mar. 17, 2009, 8 pages.
UKIPO Further Search Report Under Section 17 mailed Nov. 27, 2008, in corresponding Application No. GB 0805054.4, filed Mar. 18, 2008, 1 page.

\* cited by examiner

*Primary Examiner* — Leon-Viet Nguyen
(74) *Attorney, Agent, or Firm* — RatnerPrestia (57) ABSTRACT

A method and apparatus for performing calculations relating to the derivation of log-likelihood ratio (LLR) is provided. Coefficients in the use of deriving LLRs are calculated the calculation being applicable to any one of a plurality of constellation diagrams (PAM, QAM, PSK). The coefficients may be stored in a table of coefficients, the table corresponding to a particular constellation diagram and modulation scheme. A number of tables may be stored, each table corresponding to a particular modulation scheme. The coefficients are related to a symbol estimated to be closest to the received sample and the closest symbol to the estimated symbol having a complementary value for a bit for which the LLR is to be calculated. Certain coefficients or parts of coefficients may be omitted where the corresponding constellation diagram has symmetries.

38 Claims, 6 Drawing Sheets

| 1 | | $a_{n,0}$ | $a_{n,1}$ | $a_{n,2}$ |
|---|---|---|---|---|
| 2 | $\sigma_0$ | $2+j\cdot 2$ | $-4\cdot\sin^2(\pi/8)+j\cdot\sqrt{2}$ | $4\cdot\sin^2(\pi/8)+j\cdot\sqrt{2}$ |
| 3 | $\sigma_1$ | $\sqrt{2}+j\cdot 4\cdot\sin^2(\pi/8)$ | $j\cdot 2\sqrt{2}$ | $4\cdot\sin^2(\pi/8)+j\cdot\sqrt{2}$ |
| 4 | $\sigma_2$ | $\sqrt{2}+j\cdot 4\cdot\sin^2(\pi/8)$ | $-2+j\cdot 2$ | $-\sqrt{2}+j\cdot 4\cdot\sin^2(\pi/8)$ |
| 5 | $\sigma_3$ | $2\sqrt{2}$ | $-4\cdot\sin^2(\pi/8)+j\cdot\sqrt{2}$ | $-\sqrt{2}+j\cdot 4\cdot\sin^2(\pi/8)$ |
| 6 | $\sigma_4$ | $2+j\cdot 2$ | $-4\cdot\sin^2(\pi/8)+j\cdot\sqrt{2}$ | $-4\cdot\sin^2(\pi/8)-j\cdot\sqrt{2}$ |
| 7 | $\sigma_5$ | $\sqrt{2}+j\cdot 4\cdot\sin^2(\pi/8)$ | $j\cdot 2\sqrt{2}$ | $-4\cdot\sin^2(\pi/8)-j\cdot\sqrt{2}$ |
| 8 | $\sigma_6$ | $\sqrt{2}+j\cdot 4\cdot\sin^2(\pi/8)$ | $-2+j\cdot 2$ | $\sqrt{2}-j\cdot 4\cdot\sin^2(\pi/8)$ |
| 9 | $\sigma_7$ | $2\sqrt{2}$ | $-4\cdot\sin^2(\pi/8)+j\cdot\sqrt{2}$ | $\sqrt{2}-j\cdot 4\cdot\sin^2(\pi/8)$ |

| 1 | First and second bits (I axis) | Third and fourth bits (Q axis) | $a_{n,0}$ or $a_{n,2}$ | $b_{n,0}$ or $b_{n,2}$ | $a_{n,1}$ or $a_{n,3}$ | $b_{n,1}$ or $b_{n,3}$ |
|---|---|---|---|---|---|---|
| 2 | $\sigma_0\ \sigma_7\ \sigma_8\ \sigma_{15}$ | $\sigma_{12}\ \sigma_{13}\ \sigma_{14}\ \sigma_{15}$ | $-2\sqrt{2/5}$ | $-4/5$ | $4/\sqrt{5}$ | $4/5$ |
| 3 | $\sigma_1\ \sigma_6\ \sigma_9\ \sigma_{14}$ | $\sigma_{11}\ \sigma_{10}\ \sigma_9\ \sigma_8$ | $-2\sqrt{2/5}$ | $-4/5$ | $2\sqrt{2/5}$ | 0 |
| 4 | $\sigma_2\ \sigma_5\ \sigma_{10}\ \sigma_{13}$ | $\sigma_4\ \sigma_5\ \sigma_6\ \sigma_7$ | $2\sqrt{2/5}$ | $-4/5$ | $2\sqrt{2/5}$ | 0 |
| 5 | $\sigma_3\ \sigma_4\ \sigma_{11}\ \sigma_{12}$ | $\sigma_3\ \sigma_2\ \sigma_1\ \sigma_0$ | $2\sqrt{2/5}$ | $-4/5$ | $4/\sqrt{5}$ | $-4/5$ |

METHOD AND APPARATUS FOR PERFORMING LOG-LIKELIHOOD CALCULATIONS

TECHNICAL FIELD OF THE INVENTION

This invention relates to the calculation of log-likelihood ratios.

BACKGROUND TO THE INVENTION

Many forms of data transmission rely on the modulation of a carrier wave at a transmitter. For example, in quadrature modulation, inphase and quadrature signals (I- and Q-signals) specify symbols from a symbol alphabet. Each transmitted symbol maps to one of the symbols of the symbol alphabet and is defined by a phase and amplitude and is associated with a plurality of bits conveyed by the transmitted signal. When the signal is received, it is necessary to demodulate the signal and to determine which of the symbols of the symbol alphabet the transmitted signal correspond to.

The processing of the signal in a receiver and a transmitter, as well as transmitting the signal, introduce imperfections or distortions into the received signal. When the signal is received an estimation is made as to the information content of the received signal. It is desirable to have a statistical indication of how trustworthy this estimate is. One indicator of this is log-likelihood ratios.

When a signal is received, an estimation of transmitted symbols is made and, in this instance, log-likelihood ratios are applied to this estimation process. Here log-likelihood ratios are an indication of the likelihood that a particular bit of the estimated transmitted symbol is a 0 or a 1 and this is represented as $\lambda_{mk}, \lambda_{mk+1}, \ldots, \lambda_{mk+m-1}$ where $m=\log_2(M)$ and the symbol alphabet comprises M-symbols (i.e. an M-ary modulation scheme).

The calculation of log-likelihood ratios is computationally intensive and in the past it has been necessary to implement different calculation algorithms for different modulation schemes. Furthermore, known receivers calculate the log-likelihood ratios for each bit of each symbol as it is received, which is computationally intensive. It is therefore desirable to reduce the computational complexity of calculating log-likelihood ratios. It is further desirable to be able to easily calculate log-likelihood ratios for a variety of modulation schemes.

SUMMARY OF EMBODIMENTS OF THE INVENTION

Embodiments of the invention provide for a method for deriving one or more coefficients, said coefficients being for use in a calculation of log-likelihood ratios of bits of an estimated transmitted symbol of a predetermined constellation diagram, said constellation diagram being any one of a plurality of constellation diagrams, said method comprising the steps of:
(a) for a bit of a symbol of said constellation diagram, determining a closest further symbol, wherein said further symbol has a complementary value for a corresponding bit; and
(b) deriving said one or more coefficients with reference to said symbol and said further symbol.

Embodiments of the invention are able to derive one or more coefficients used in calculating a log-likelihood ratio of bits of an estimated transmitted symbol of a predetermined constellation diagram where the constellation diagram is any one of a plurality of constellation diagrams. Therefore, the method of these embodiments is equally applicable to more than one constellation diagram. For example, embodiments of the invention may be applied to constellation diagrams corresponding to PSK, PAM, QAM, ASK etc. modulations. Embodiments of the invention are, in particular, applicable to the constellation diagrams of linear modulations. In certain circumstances, linear modulation schemes may be used to approximate non-linear schemes.

It is therefore possible to derive a set of coefficients and store the coefficients for later retrieval in use in respect of multiple modulation schemes. Therefore, a receiver configured to operate according to this method of embodiments of the invention is able to calculate log-likelihood ratios for any one of a plurality of modulation schemes. This is simpler and cheaper than having to calculate log-likelihood ratios separately for each modulation scheme, particularly where the receiver is used to receive and decode signals modulated according to more than one modulation scheme.

Step (a) may be repeated for a plurality of bits of said symbol.

Step (a) may be repeated for a plurality of symbols of said constellation diagram.

Step (a) may comprise the step of deriving no more than a first and a second coefficient corresponding to said bit.

Said first coefficient may comprise a complex difference between symbols and said second coefficient may comprise a difference between energies of symbols.

Embodiments of the invention need derive no more than a first coefficient and a second coefficient for each bit of, the symbol of the constellation diagram. This is significantly simpler than those arrangements where more than two coefficients need be calculated for corresponding bits of a constellation diagram. Furthermore, the first and the second coefficient may be used to calculate log-likelihood ratios for each of the constellation diagrams of the plurality of constellation diagrams. The calculation of the first and the second coefficient could be easily hard-coded and applied to various constellation diagrams. Therefore embodiments of the invention provide a simple and versatile method for calculating log-likelihood ratios.

At least one of said coefficients may include a real part and the other of said coefficients may include an imaginary part.

The first coefficient may include no more than a real part and an imaginary part and the second coefficient may include no more than a real part.

As the first coefficient includes no more than a real part and an imaginary part and the second coefficient includes no more than a real part, embodiments of the invention are simple and easy to implement. Furthermore, the first coefficient and the second coefficient may be used to calculate log-likelihood ratios for each of the plurality of constellation diagrams.

The method may include the step of reducing a number of coefficients, or parts of coefficients, by considering symmetries in said constellation diagram.

Step (a) may be repeated for each bit of each symbol of said constellation diagram.

Said further symbol may be determined with reference to a Gray coding for said symbols of said constellation diagram. Gray coding ensures that the bit labels of adjacent symbols on the constellation diagram vary by the value of only one bit.

The method may include the step of generating a plurality of sets of coefficients according to the aforementioned method, each set of coefficients corresponding to a predetermined constellation diagram, and storing each set in a corresponding store so that each store is associated with a corresponding constellation diagram. This allows for the calculation of log-likelihood ratios for symbols defined according to different modulation schemes.

Further embodiments of the invention extend to an apparatus configured to derive one or more coefficients, said coefficients being for use in a calculation of log-likelihood ratios of bits of an estimated transmitted symbol of a predetermined constellation diagram, said constellation diagram being any one of a plurality of constellation diagrams, said apparatus being configured to:
(a) for a bit of a symbol of said constellation diagram, determine a closest further symbol, wherein said further symbol has a complementary value for a corresponding bit; and
(b) derive said one or more coefficients with reference to said symbol and said further symbol.

The apparatus may be configured to repeat step (a) for a plurality of bits of said symbol.

The apparatus may be configured to repeat step (a) for a plurality of symbols of said constellation diagram.

The apparatus may be configured to derive no more than a first and a second coefficient corresponding to said bit.

Said first coefficient may include no more than a real part and an imaginary part and said second coefficient may include no more than a real part.

The apparatus may be configured to reduce a number of coefficients, or parts of coefficients, by considering symmetries in said constellation diagram.

The apparatus may be configured to repeat step (a) for each bit of each symbol of said constellation diagram.

The apparatus may be configured to determine said further symbol with reference to a Gray coding for said symbols of said constellation diagram.

Said coefficients may include a first coefficient, $a_{j_k,p}$ and a second coefficient, $b_{j_k,p}$, wherein said first and said second coefficients are calculated, for a $p^{th}$ bit of a $k^{th}$ symbol according to:

$$a_{j_k,p} = 2 \cdot (-1)^{\beta_{j_k,p}} \cdot (\sigma_{j_k} - \sigma_{j_k,\bar{p}})^*$$
$$b_{j_k,p} = (-1)^{\beta_{j_k,p}} \cdot [\|\sigma_{j_k,\bar{p}}\|^2 - \|\sigma_{j_k}\|^2]$$

where $\sigma_{j_k}$ is said $k^{th}$ symbol, $\sigma_{j_j,\bar{p}}$ is said further symbol and $\beta_{k_k,p}$ is a value of the $p^{th}$ bit of said symbol $\sigma_{j_k}$.

The apparatus may be configured to generate a plurality of sets of coefficients, each set of coefficients corresponding to one of said plurality of constellation diagrams, and storing each set in a corresponding store so that each store is associated with a corresponding constellation diagram.

The apparatus may comprise a processor.

According to a further aspect, the invention provides for a method for generating a log-likelihood ratio for a received sample derived from a received signal modulated according to a predetermined modulation scheme with a corresponding constellation diagram which includes the steps of
(a) finding an estimated transmitted symbol by finding a closest symbol of said constellation diagram to said received sample;
(b) retrieving one or more coefficients, wherein said one or more coefficients are retrieved with reference to said closest symbol; and
(c) calculating the log-likelihood ratio on the basis of said one or more retrieved coefficients.

By retrieving coefficients, preferably from a stored table, which are used to calculate log-likelihood ratios, the invention significantly reduces the computational complexity of generating log-likelihood ratios by replacing a significant portion of the calculation with a retrieve operation.

The retrieved coefficients may correspond to a bit of said estimated transmitted symbol, in which case, steps (b) and (c) may be performed for each bit of the estimated transmitted symbol.

Said estimated transmitted symbol may be determined by means of a hard decision. The hard decision may be performed by a slicer.

Step (c) may be calculated with reference to the received sample.

Step (a) may include the step of compensating for a propagation gain and/or an added noise.

Step (b) may include the step of retrieving said one or more coefficients from a selected one of a plurality of tables of coefficients, said table being selected according to an association with said constellation diagram. In this instance, the log-likelihood ratios for signals modulated according to more than one modulation scheme may be calculated by the same apparatus. Each of said tables may correspond to a different modulation scheme.

The coefficients may include a first coefficient, $a_{j_k,p}$ and a second coefficient, coefficient, $b_{j_k,p}$, wherein said first and said second coefficients are calculated, for a $p^{th}$ bit of a $k^{th}$ symbol according to:

$$a_{j_k,p} = 2 \cdot (-1)^{\beta_{j_k,p}} \cdot (\sigma_{j_k} - \sigma_{j_k,\bar{p}})^*$$
$$b_{j_k,p} = (-1)^{\beta_{j_k,p}} \cdot [\|\sigma_{j_k,\bar{p}}\|^2 - \|\sigma_{j_k}\|^2]$$

where $\sigma_{j_k}$ is said $k^{th}$ symbol, $\sigma_{j_k,\bar{p}}$ is said further symbol and $\beta_{j_k,p}$ is a value of the $p^{th}$ bit of said symbol $\sigma_{j_k}$ ($j_k$ is any integer in the range 0 to M−1 inclusive).

The method may include the step of generating a table of coefficients, each of said coefficients derived according to the formulae mentioned for $a_{j_k,p}$ and $b_{j_k,dp}$, and wherein said log-likelihood ratio is calculated according to:

$$\lambda_{mk+p} = \frac{\|g_k\|^2}{2 \cdot N_0} \cdot [\Re e(a_{j_k,p} \cdot r_k) + b_{j_k,p}]$$

where $\lambda_{mk+p}$ is a log-likelihood ratio for a bit at position mk+p ($p^{th}$ bit of the $k^{th}$ processed symbol having m bits), $r_k$ is said received sample, $g_k$ is a complex channel gain (equivalent channel as seen after multi-path compensation by the LLR computation block) and $N_0$ is the single sided noise power spectral density.

Further embodiments of the invention extend to an apparatus configured to generate a log-likelihood ratio for a received sample derived from a received signal modulated according to a predetermined modulation scheme with a corresponding constellation diagram, said apparatus being configured to:
(a) find an estimated transmitted symbol by estimating a closest symbol of said constellation diagram to said received sample;
(b) retrieve one or more coefficients, wherein said one or more coefficients are retrieved with reference to said estimated closest symbol; and
(c) calculate the log-likelihood ratio on the basis of said one or more retrieved coefficients.

Said retrieved coefficients may correspond to a bit of said estimated transmitted symbol.

The apparatus may be configured to perform in steps (b) and (c) for each bit of the estimated transmitted symbol.

The apparatus may be configured to determine said estimated transmitted symbol by means of a hard decision.

The apparatus may be configured to calculate step (a) with reference to the received sample.

The apparatus may be configured to compensate for a propagation gain and/or an added noise.

The apparatus may be configured to retrieve said one or more coefficients from a selected one of a plurality of tables of coefficients, said table being selected according to an association with said constellation diagram.

The apparatus may comprise a processor.

A further embodiment of the invention extends to a method of calculating a log-likelihood ratio which includes deriving a first coefficient, $a_{j_k,p}$ and a second coefficient, $b_{j_k,p}$, wherein said first and said second coefficients are calculated, for a $p^{th}$ bit of a $k^{th}$ symbol according to:

$$a_{j_k,p} = 2 \cdot (-1)^{\beta_{j_k,p}} \cdot (\sigma_{j_k} - \sigma_{j_k,\bar{p}})^*$$
$$b_{j_k,p} = (-1)^{\beta_{j_k,p}} \cdot [\|\sigma_{j_k,\bar{p}}\|^2 - \|\sigma_{j_k}\|^2]$$

where $\sigma_{j_k}$ is said $k^{th}$ symbol, $\sigma_{j_k,\bar{p}}$ is said further symbol and $\beta_{j_k,p}$ is a value of the $p^{th}$ bit of said symbol $\sigma_{j_k}$, and wherein said log-likelihood ratio is calculated according to:

$$\lambda_{mk+p} = \frac{\|g_k\|^2}{2 \cdot N_0} \cdot [\Re e(a_{j_k,p} \cdot r_k) + b_{j_k,p}]$$

where $\lambda_{mk+p}$ is a log-likelihood ratio for a bit at position mk+p, $r_k$ in said received sample, $g_k$ is a complex channel gain and $N_0$ is a single-sided noise power spectral density.

BRIEF DESCRIPTION OF THE DRAWINGS

Further features and advantages of the present invention will become apparent from the following description of embodiments thereof, presented by way of example, and by reference to the accompanying drawings, wherein like reference numerals refer to like parts, and where:—

DESCRIPTION OF PREFERRED EMBODIMENTS

Figure 1:
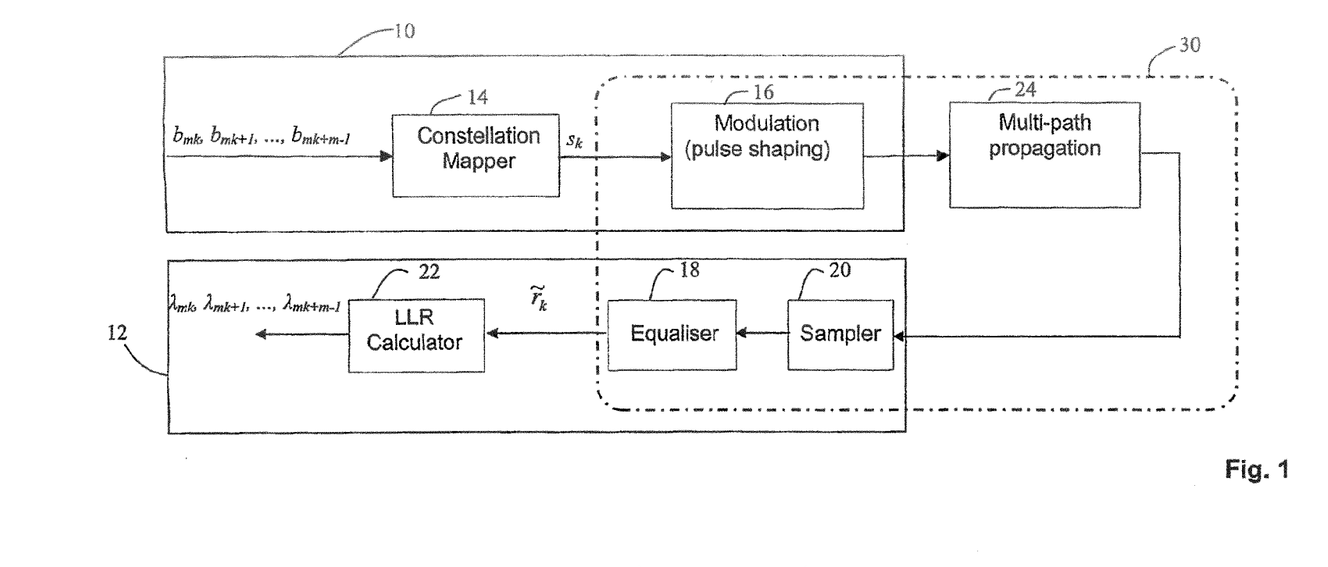
FIG. 1 is a schematic illustration of various processes which a transmitted and received signal undergo.

In FIG. 1 a signal modulated according to an M-ary modulation scheme with m=$\log_2$(M) bits per symbol is transmitted by a transmitter 10 and received by a receiver 12. Transmitter 10 and receiver 12 are illustrated symbolically, omitting many details, which are know in the art. In the transmitter 10 a coded bitstream $b_{mk}$, $b_{mk+1}$, . . . , $b_{mk+m-1}$ is input to a constellation mapper 14 which outputs symbols $s_k$ according to the chosen modulation scheme. The symbols $s_k$ then undergo a modulation or pulse-shaping procedure at block 16 in the transmitter 10 and are then transmitted according to a multi-path propagation 24. The signal is then received by the receiver 12 where it undergoes sampling at a sampler 20 and equalization at an equalizer 18 to produce a raw received sample $\tilde{r}_k$. This raw received sample is processed by LLR calculator 22 to produce the log likelihood ratios $\lambda_{mk}$, $\lambda_{mk+1}$, . . . , $\lambda_{mk+m-1}$.

Figure 2:
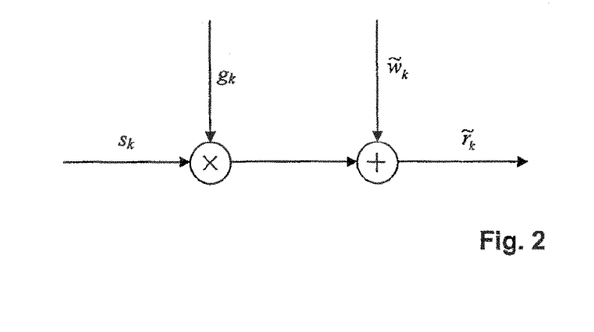
FIG. 2 is a schematic representation of variations which occur in a signal between transmission and reception.

FIG. 2 is a schematic illustration of the variations in a signal which occur during transmission, multi-path propagation, and equalization (multi-path propagation compensation) from the perspective of the LLR calculator 22. A signal received by the LLR calculator 22 undergoes processing and transmission. This processing and transmission of the signal and subsequent equalization is equivalent to adding a gain and noise to the signal. FIG. 2 illustrates the transmitted signal $s_k$ modified by a channel gain $g_k$ to which noise $\tilde{w}_k$ is added to produce the raw received sample $\tilde{r}_k$.

Therefore, $$\tilde{r}_k = g_k \cdot s_k + \tilde{w}_k$$

where $\tilde{w}_k$ is complex white Gaussian noise with variance $\sigma^2(\tilde{w}) = 2 \cdot N_0$ where $N_0$ is the single sided noise power spectral density $g_k$ is a complex channel gain, which decomposes as: $g_k = \sqrt{2 \cdot E_s} \cdot h_k$, where $E_s$ is the average transmitted energy per symbol and $h_k$ is a complex propagation gain.

It is to be realised that this is a modelling of the transmission, multi-path propagation and equalization of the signal as received at the LLR calculator 22 and therefore incorporates the effects of the processing mentioned above with reference to FIG. 1.

Figure 3:
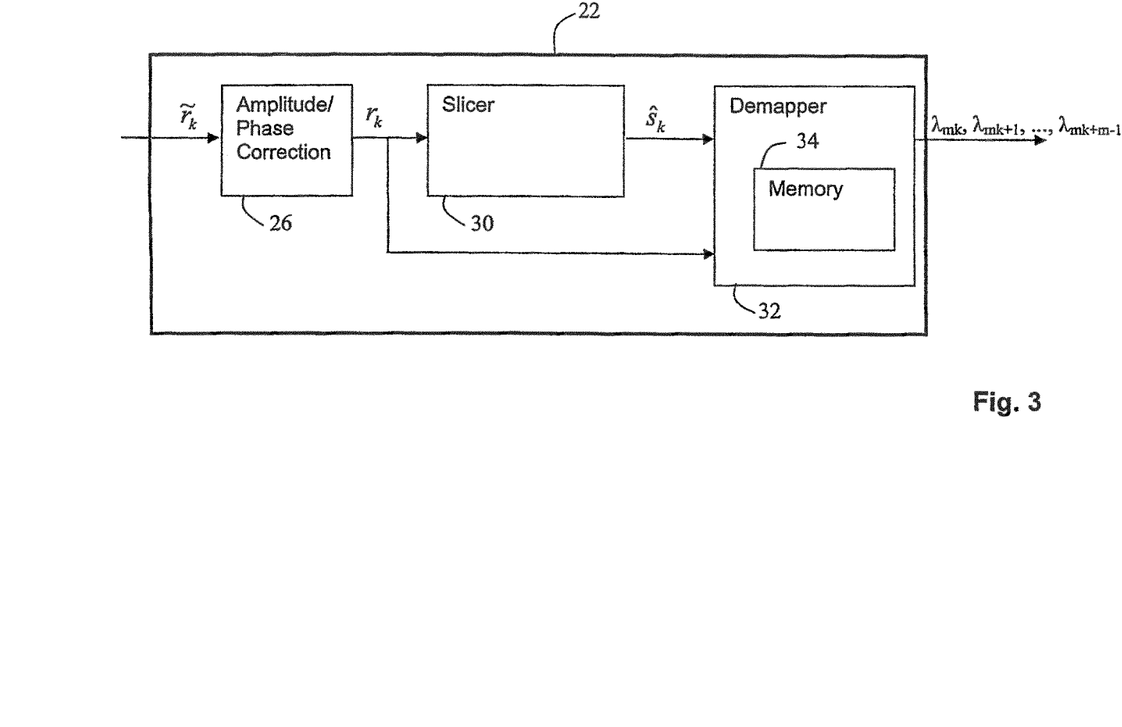
FIG. 3 is a schematic illustration of a portion of a receiver including an embodiment of the invention.

FIG. 3 is a schematic illustration of the LLR calculator 22. The LLR calculator includes a slicer 30 and soft-output demapper 32. The amplitude/phase correction block 26 uses the aforementioned complex gain $g_k$ to derive the received sample $r_k$ from the raw received sample $\tilde{r}_k$. Slicer 30 and soft-output demapper 32 receive the sample $r_k$. Slicer 30 produces estimated transmitted symbol $\hat{s}_k$ by means of a hard decision in a manner known in the art. The soft-output demapper 32 receives the estimated transmitted symbol $\hat{s}_k$ and the received sample $r_k$ and produces a set of log-likelihood ratios $\lambda_{mk}, \lambda_{mk+1}, \ldots, \lambda_{mk+m-1}$, as illustrated in FIG. 3. Soft-output demapper 32 further includes a memory 34 for data storage, as described in greater detail below.

It is assumed that $g_k$ is known and compensated for by the amplitude/phase correction block 26 after equalization and before entering the slicer 30. Therefore the received sample $r_k$ at the slicer 30 can be expressed as:

$$r_k = \frac{\tilde{r}_k}{g_k} = s_k + w_k$$

where $w_k$ is complex white Gaussian noise with variance $$\sigma^2(w) = \frac{2 \cdot N_0}{\|g_k\|^2}$$

The estimated transmitted symbol is one of a plurality of symbols:

$$\hat{s}_k = \sigma_{j_k} \text{ where } j_k \in [0; M-1] \quad (1)$$

Furthermore, the estimated transmitted coded bits are divided according to symbol such that the estimated transmitted bit at position mk+p in the transmitted signal corresponds to the bit at the $p^{th}$ position of symbol $\sigma_{j_k}$:

$$\hat{b}_{mk+p} = \beta_{j_k, p} \quad (2)$$

The expression for the log-likelihood ratio for the bit at position mk+p is:

$$\lambda_{mk+p} = \ln\left[\frac{P(b_{mk+p} = 0 \mid r_k)}{P(b_{mk+p} = 1 \mid r_k)}\right] \quad (3)$$

The following subsets of symbols are defined:
The subset of symbols the $p^{th}$ bit of which is 0:
$\Omega_{p,0} = \{\sigma_n \in \Omega / \beta_{n,p} = 0\}$
The subset of symbols the $p^{th}$ bit of which is 1:
$\Omega_{p,1} = \{\sigma_n \in \Omega / \beta_{n,p} = 1\}$
The subset of symbols the $p^{th}$ bit of which is the complementary of that of a given symbol $\sigma_q$:

$$\Omega_{\overline{p}}(\sigma_q) = \{\sigma_n \in \Omega / \beta_{n,p} = \overline{\beta_{q,p}}\} \quad (4)$$

Then, it is known from Bayes rule that:

$$\frac{P(b_{mk+p} = 0 \mid r_k)}{P(b_{mk+p} = 1 \mid r_k)} = \frac{P(r_k \mid b_{mk+p} = 0)}{P(r_k \mid b_{mk+p} = 1)} \cdot \frac{P(b_{mk+p} = 0)}{P(b_{mk+p} = 1)} \quad (5)$$

Assuming that bits with values 0 and 1 are equally distributed, i.e. that:

$$P(b_{mk+p}=0)=P(b_{mk+p}=1) \quad (6)$$

Assuming further that all possible symbols are equally distributed in the estimated received signal:

$$P(s_k=\sigma_i)=P(s_k=\sigma_j) \quad (7)$$

Since there are conditional relations between the estimated received signal, the received signal and a particular symbol:

$$P(r_k \mid b_{mk+p} = 0) = \sum_{\sigma_n \in \Omega_{p,0}} P(r_k \mid s_k = \sigma_n) \cdot P(s_k = \sigma_n) \quad (8)$$

A corresponding expression to that of equation (8) exists for $P(r_k \mid b_{mk+p}=1)$ where the sum is then calculated for $\sigma_n \in \Omega_{p,1}$.

Therefore, combining equations (3), (5), (8) and the corresponding expression for $P(r_k \mid b_{mk+p}=1)$, the log-likelihood ratios can be expressed as:

$$\lambda_{mk+p} = \ln\left[\frac{\sum_{\sigma_n \in \Omega_{p,0}} P(r_k \mid s_k = \sigma_n)}{\sum_{\sigma_n \in \Omega_{p,1}} P(r_k \mid s_k = \sigma_n)}\right] \quad (9)$$

There is a log-sum approximation:

$$\ln\left[\sum_{i \in I} x_i\right] \approx \ln[\max_{i \in I}(x_i)] \quad (10)$$

which holds provided that the sum in the left-hand side is dominated by the largest term.

This approximation is applicable to the calculation of log-likelihood ratios, provided that the corresponding channel has a relatively high signal to noise ratio (which will apply in practice due to the aforementioned pre-processing of the signal). Therefore, equation (9) can be rewritten as:

$$\lambda_{mk+p} \approx \ln\left[\frac{\max_{\sigma_n \in \Omega_{p,0}} P(r_k \mid s_k = \sigma_n)}{\max_{\sigma_n \in \Omega_{p,1}} P(r_k \mid s_k = \sigma_n)}\right] \quad (11)$$

Furthermore, $P(r_k \mid s_k = \sigma_n)$ can be expressed in terms of the Gaussian distribution:

$$P(r_k \mid s_k = \sigma_n) = \frac{\|g_k\|^2}{2\pi \cdot N_0} \cdot \exp\left(-\frac{\|g_k\|^2}{2 \cdot N_0} \cdot \|r_k - \sigma_n\|^2\right) \quad (12)$$

Then, combining equations (11) and (12), gives the following expression for the log-likelihood ratios:

$$\lambda_{mk+p} \approx \frac{\|g_k\|^2}{2 \cdot N_0} \cdot \left[\min_{\sigma_n \in \Omega_{p,1}} \|r_k - \sigma_n\|^2 - \min_{\sigma_n \in \Omega_{p,0}} \|r_k - \sigma_n\|^2\right] \quad (13)$$

As stated, the slicer 30 determines the closest symbol to the received sample $\hat{s}_k = \sigma_{j_k}$ where:

$$\sigma_{j_k} = \underset{\sigma_n \in \Omega}{\text{ArgMin}} \|r_k - \sigma_n\|^2 \quad (14)$$

The closest symbol to a symbol detected by the slicer 30 which would result in the $p^{th}$ bit having a complementary value is defined as:

$$\sigma_{j_k, p} = \underset{\sigma_n \in \Omega_{\overline{p}}(\sigma_{j_k})}{\text{ArgMin}} \|\sigma_{j_k} - \sigma_n\|^2 \quad (15)$$

Gray coding is a system of labelling the symbols on a constellation diagram so that a particular symbol varies in its label from adjacent symbols only by the value of one bit. If this labelling is used here:

$$\underset{\sigma_n \in \Omega_{p,1}}{\text{Min}} \|r_k - \sigma_n\|^2 - \underset{\sigma_n \in \Omega_{p,0}}{\text{Min}} \|r_k - \sigma_n\|^2 = \quad (16)$$
$$(-1)^{\beta_{j_k,p}} \cdot [\|r_k - \sigma_{j_k,\overline{p}}\|^2 - \|r_k - \sigma_{j_k}\|^2]$$

Equation (13) can then be rewritten as:

$$\lambda_{mk+p} = \frac{\|g_k\|^2}{2 \cdot N_0} \cdot (-1)^{\beta_{j_k,p}} \cdot [\|r_k - \sigma_{j_k,\overline{p}}\|^2 - \|r_k - \sigma_{j_k}\|^2]$$

$$\lambda_{mk+p} = \frac{\|g_k\|^2}{2 \cdot N_0} \cdot (-1)^{\beta_{j_k,p}} \cdot [2 \cdot \Re e(r_k \cdot (\sigma_{j_k} - \sigma_{j_k,\overline{p}})^*) + \|\sigma_{j_k,\overline{p}}\|^2 - \|\sigma_{j_k}\|^2]$$

which can be seen as:

$$\lambda_{mk+p} = \frac{\|g_k\|^2}{2 \cdot N_0} \cdot [\Re e(a_{j_k,p} \cdot r_k) + b_{j_k,p}] \quad (17)$$

where:

$$a_{j_k,p} = 2 \cdot (-1)^{\beta_{j_k,p}} \cdot (\sigma_{j_k} - \sigma_{j_k,\overline{p}})^* \quad (18)$$
$$b_{j_k,p} = (-1)^{\beta_{j_k,p}} \cdot [\|\sigma_{j_k,\overline{p}}\|^2 - \|\sigma_{j_k}\|^2]$$

From equation (17) it is evident that the noise variance $2 \cdot N_0$ is necessary to evaluate the log-likelihood ratios. This may be supplied by a channel estimator or a dedicated noise estimator of the receiver (not shown in the diagrams), or may be estimated (with a bias) at the output of the slicer 30, assuming that the noise is constant over each block, by:

$$\hat{N}_0 = \frac{1}{2K} \sum_{k=0}^{K-1} \|g_k\|^2 \cdot \|r_k - \hat{s}_k\|^2 \quad (19)$$

Figure 4:
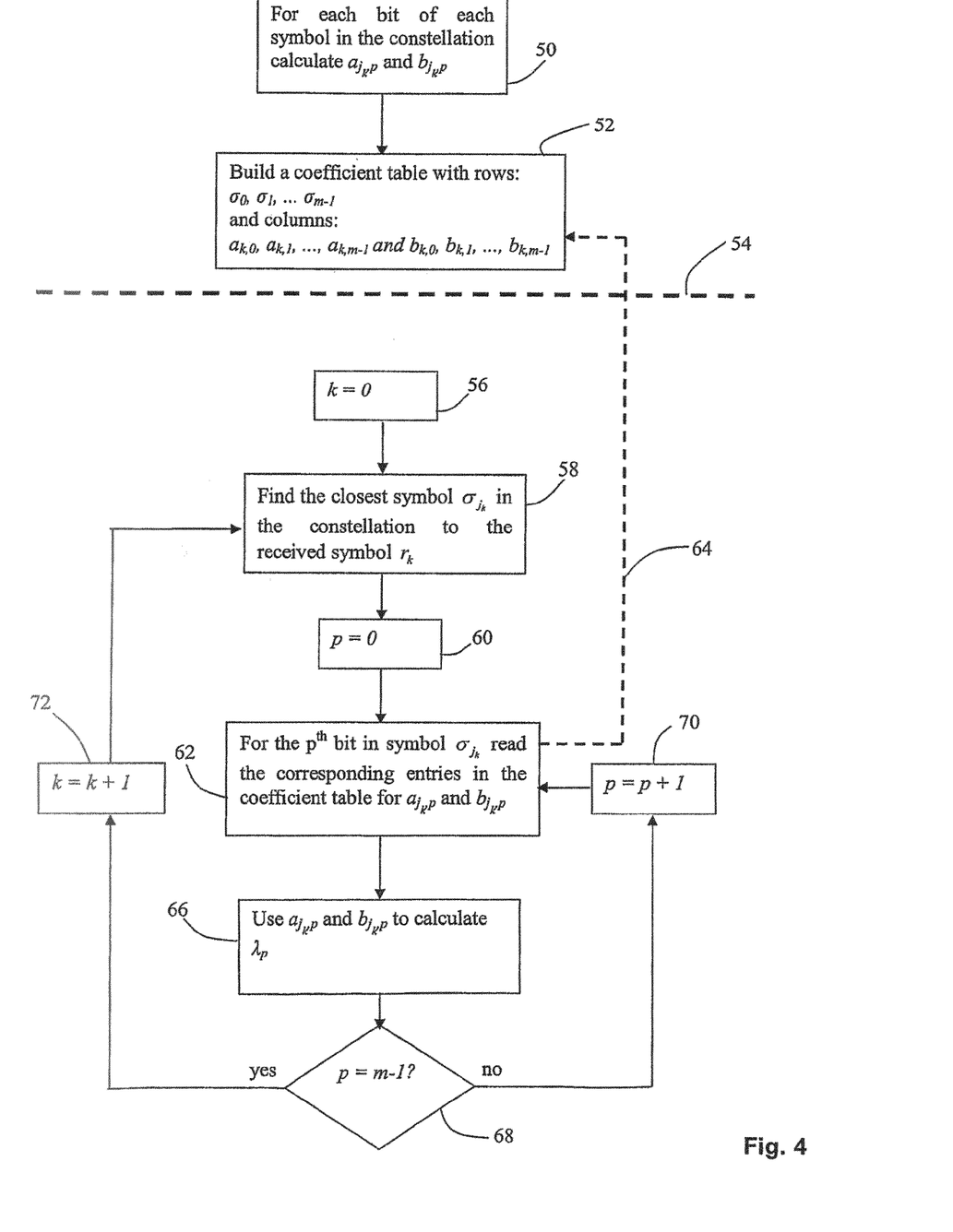
FIG. 4 is a flow diagram of process steps of an embodiment of the invention.

FIG. 4 illustrates the process whereby embodiments of the invention operate. Block 50 of FIG. 4 represents the beginning of the initialization process whereby, for a particular constellation diagram, equation (18) is evaluated for each bit of each symbol in the constellation. Then, in block 52, a coefficient table is generated. The content of the table will depend on the constellation diagram. For certain constellations, the table has rows corresponding to each of the symbols of the constellation diagram and columns for the real and the imaginary parts of $a_{j_k,p}$ and for the values of $b_{j_k,p}$ for the corresponding symbol. For other constellations however, it is not necessary to generate each of the coefficients (or each part of each coefficient) for each of the symbols, as described below. This coefficient table is then stored in memory 34 of the demapper 32 (FIG. 3) and utilised by the demapper to calculate the log-likelihood ratios.

Line 54 denotes the divide between the initialization process (blocks 50 and 52) and the process performed as the transmitted signal is received. In block 56 $k$, which is used to denote a particular time index of the symbol of the received transmission, is set to zero (i.e. this represents the first symbol of the received transmission). In block 58, the closest symbol to the received sample is determined by the slicer 30 in a hard decision.

In block 60 $p$, which denotes a particular bit of the $k^{th}$ symbol, is set to zero, indicating that the first bit of the symbol is considered. The demapper 32 then retrieves the a- and b-coefficients from the table in block 62 for the $p^{th}$ bit of symbol $\sigma_{j_k}$. The access to the previously generated table is represented by dashed arrow 64.

Then, in block 66, the demapper uses the retrieved values for the a- and b-coefficients to determine the log-likelihood ratio for the $p^{th}$ bit according to equation (17). The process then moves to decision block 68 to determine if p is equal to m−1. As stated, a particular symbol encoded according to an M-ary constellation map and will have m=$\log_2$(M) bits per symbol. In this instance, the value of p ranges from 0 to m−1 for each received symbol. If p is less than m−1, the process will proceed to block 70 to increment the value of p, and then on to block 62 to repeat the process of blocks 62, 66 and 68 for the next bit of the symbol.

If it is determined that p is equal to m−1 at block 68, the process moves to block 72 where the value of k is incremented and therefore the next received sample is evaluated according to the above process. Although not depicted in FIG. 4, the process will terminate when there are no further received samples.

As the values of the a- and b-coefficients are stored in a store in the form of the table, embodiments of the invention display a substantially reduced computational complexity over prior art systems which calculate the log-likelihood ratios for each incoming bit.

Referring back to equation (18), it is to be realised that embodiments of the invention are applicable to many different modulation schemes such as various forms of PSK, QAM, and PAM.

Embodiments of the invention are further applicable to receivers capable of receiving a number of signals modulated according to different modulation schemes. In this instance, during initialization, a plurality of tables will be generated at block 52, each table corresponding to a particular constellation diagram, and therefore to a particular modulation scheme. It is then necessary for the correct table to be accessed when the received signal is processed. A table identification may then be set as a starting parameter before the process starts at block 56, or may be specified when the table is accessed at block 62.

For any M-ary constellation, the coefficient table will require at most 3 M $\log_2$(M) real elements to store the required coefficients. However, in practice, this may be reduced. For example in all PSK modulations, all symbols have the same energy and therefore the b-coefficient will be zero. For such a modulation scheme it is necessary to only store the a-coefficients which reduces the overall storage need to two-thirds of the theoretical requirement.

Furthermore, for all PAM modulations the symbols are real and it is therefore unnecessary to store the imaginary parts of the a-coefficients. This too reduces the overall storage need to two-thirds of the theoretical limit.

For all QAM modulations, the symmetries of the diagram can be exploited so that the diagram can be considered as a $\sqrt{M}$-PAM scheme both on the I and Q axis. An example of this is described below with reference to FIGS. 7 and 8. By utilising the symmetries of this constellation diagram the storage requirements of such a scheme is reduced by $3\sqrt{M}$ of the theoretical storage need.

It will be realised therefore that symmetries in any given constellation diagram of a modulation scheme may be utilised to reduce the amount of storage required for the coefficient table.

Figure 5:
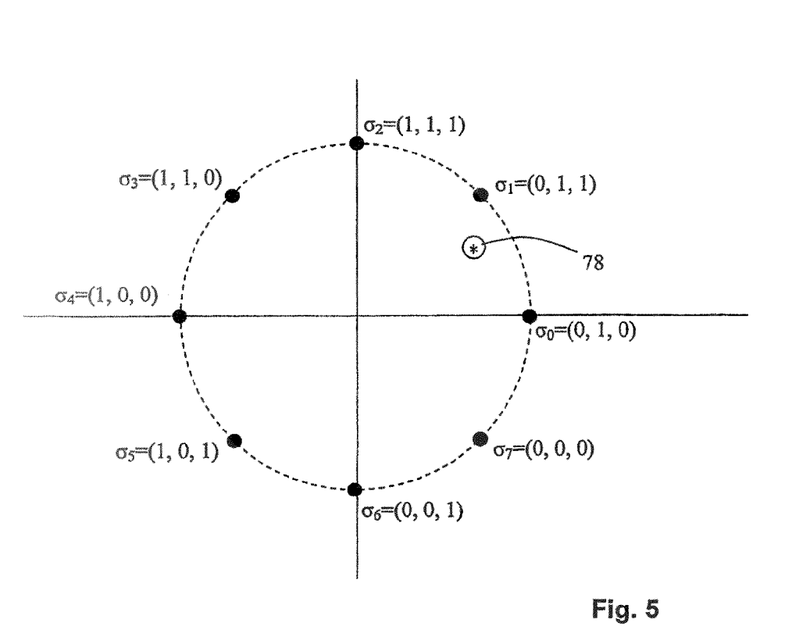
FIG. 5 is a 8PSK constellation diagram to which an embodiment of the invention is applied.
Figure 6:
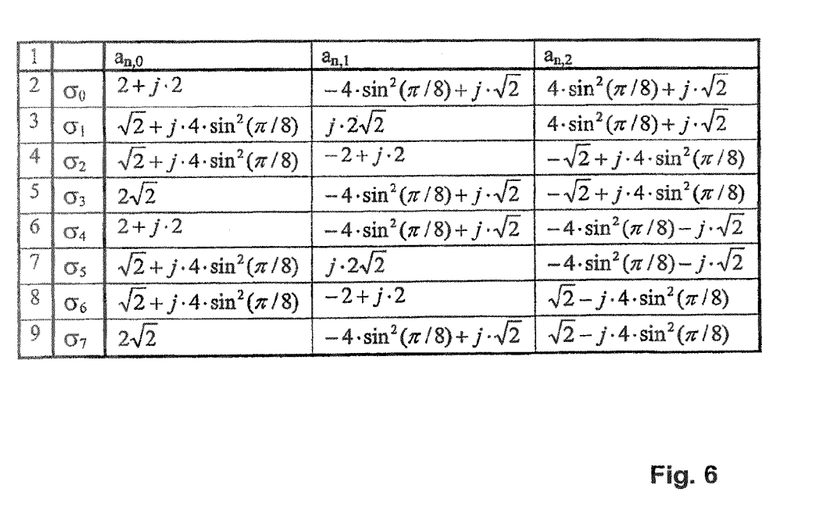
FIG. 6 is a representation of a coefficient table produced by an embodiment of the invention with reference to the constellation diagram of FIG. 5.

FIG. 5 illustrates a 8PSK constellation diagram with unit radius where Gray coding has been used to label the bits of the symbols and for which, according to an embodiment of the invention, a table of coefficients is calculated. As previously stated, the symbols of such a modulation scheme all have the same energy and therefore it is not necessary to calculate the b-coefficients. FIG. 6 illustrates the coefficient table calculated for the constellation diagram of FIG. 5.

Referring back to FIG. 5, point 78 illustrates a received sample and with reference to which the operation of this embodiment of the invention will be described. The coefficient table of FIG. 6 will have been generated and stored prior to the reception of sample 78 (as described with reference to blocks 50 and 52 of FIG. 4). Then, the closest symbol $\sigma_{j_k}$ of the constellation to the received sample is determined (block 58 of FIG. 4). In this example, the closest symbol to sample 78 is symbol $\sigma_1$. Therefore the a-coefficients from the coefficient table of FIG. 6 corresponding to symbol $\sigma_1$ for the first, second and third bit positions are determined (from row 3 of the table of FIG. 6) and the log-likelihood ratios for these bits calculated according to equation (17), with reference to received sample 78. The noise variance is determined by the slicer 30 from the received sample $r_k$ in the manner described above.

If the received sample is: $r_k = I + j \cdot Q$, then, reading the a- and b-coefficients from row 3 of the table in FIG. 6, the LLRs are calculated as follows.

For the first bit:

$$\lambda_{3k+0} = \frac{\|g_k\|^2}{2 \cdot N_0} \cdot [\Re e(a_{1,0} \cdot r_k) + b_{1,0}] = \frac{\|g_k\|^2}{2 \cdot N_0} \cdot [I \cdot \sqrt{2} - Q \cdot 4 \cdot \sin^2(\pi/8)]$$

For the second bit:

$$\lambda_{3k+1} = \frac{\|g_k\|^2}{2 \cdot N_0} \cdot [\Re e(a_{1,1} \cdot r_k) + b_{1,1}] = \frac{\|g_k\|^2}{2 \cdot N_0} \cdot [-Q \cdot 2 \cdot \sqrt{2}]$$

For the third bit:

$$\lambda_{3k+2} = \frac{\|g_k\|^2}{2 \cdot N_0} \cdot [\Re e(a_{1,2} \cdot r_k) + b_{1,2}] = \frac{\|g_k\|^2}{2 \cdot N_0} \cdot [I \cdot 4 \cdot \sin^2(\pi/8) - Q \cdot \sqrt{2}]$$

Storage space can be saved by exploiting symmetries in the constellation diagram. For the first and second bits ($a_{n,0}$ and $a_{n,1}$), the coefficients have the same values every fourth row (same value for $\sigma_0$ as for $\sigma_4$, same value for $\sigma_1$ as $\sigma_5$, etc. . . . ). This is illustrated in FIG. 5 where the first bit is 0 in a whole half plane for $\sigma_0$, $\sigma_1$, $\sigma_6$, $\sigma_7$, and is 1 in the complementary half plane for $\sigma_2$, $\sigma_3$, $\sigma_4$, $\sigma_5$. Similarly, the second bit is 0 in a whole half plane for $\sigma_0$, $\sigma_1$, $\sigma_2$, $\sigma_3$, and is 1 in the complementary half plane for $\sigma_4$, $\sigma_5$, $\sigma_6$, $\sigma_7$.

For the third bit ($a_{n,3}$), coefficients in successive rows have the same value (same value for $\sigma_0$ as for $\sigma_1$, same value for $\sigma_2$ as $\sigma_3$, etc. . . . ). This is illustrated in FIG. 5 where the third bit is constant in quarter planes (1 for $\sigma_1$ and $\sigma_2$, or $\sigma_5$ and $\sigma_6$; 0 for $\sigma_1$ and $\sigma_2$, or $\sigma_5$ and $\sigma_6$).

For the coefficients with the same value, it is not necessary to calculate each instance, but the value may be read from the storage location of the first occurring instance.

Figure 7:
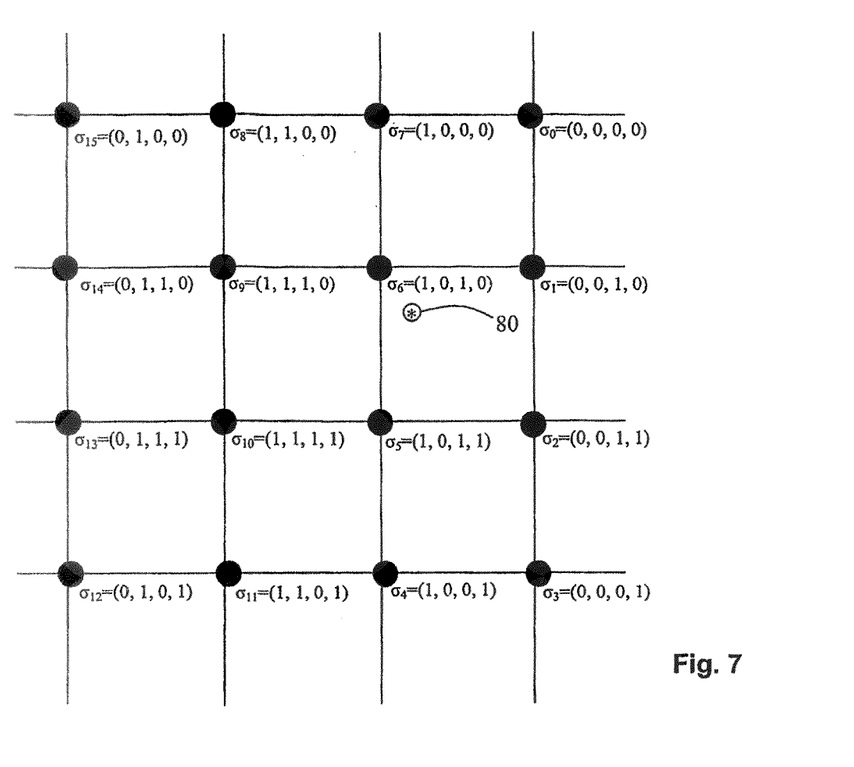
FIG. 7 is a 16QAM constellation diagram to which an embodiment of the invention is applied.

FIG. 7 illustrates a 16QAM constellation diagram to which an embodiment of the invention is applied. The constellation diagram is formed by symbols arranged on a grid at positions $$\pm \frac{1}{\sqrt{10}} \text{ or } \pm \frac{3}{\sqrt{10}}.$$

Figure 8:
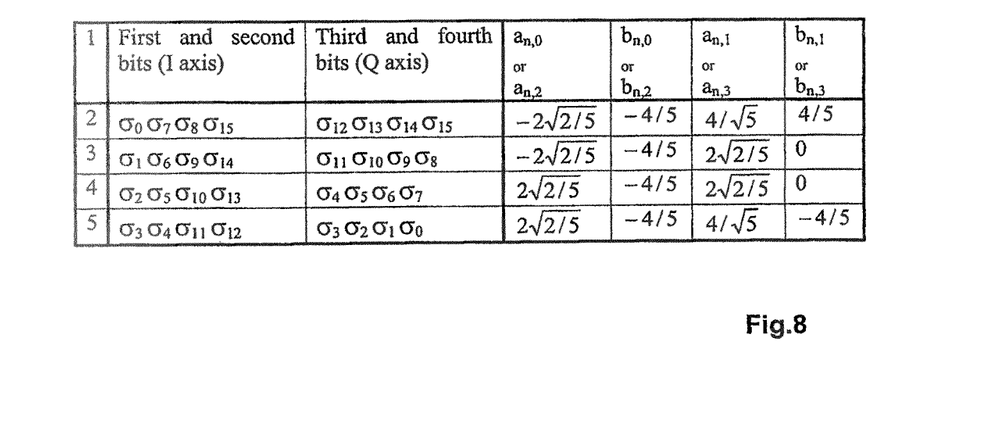
FIG. 8 is a representation of a coefficient table produced by an embodiment of the invention with reference to the constellation diagram of FIG. 7.

As before, Gray coding is used to label the bits of the symbols of the diagram. FIG. 8 illustrates the coefficient table calculated by the process described above with reference to FIG. 4. As previously stated, the 16QAM constellation diagram can be considered as two separate 4PAM diagrams on the I and Q axes for the purposes of calculating the a- and b-coefficients and it is therefore necessary to only store 16 entries in the coefficient table for the constellation diagram of FIG. 7. The symmetries are illustrated in FIG. 7 where it can be seen that for any given symbol, the closest symbol having a complementary bit value for the first and second bit positions will lie horizontally adjacent to that symbol. Similarly, the closest symbol having a complementary bit value for the third and fourth bit positions will lie vertically adjacent to that symbol.

Figure 9:
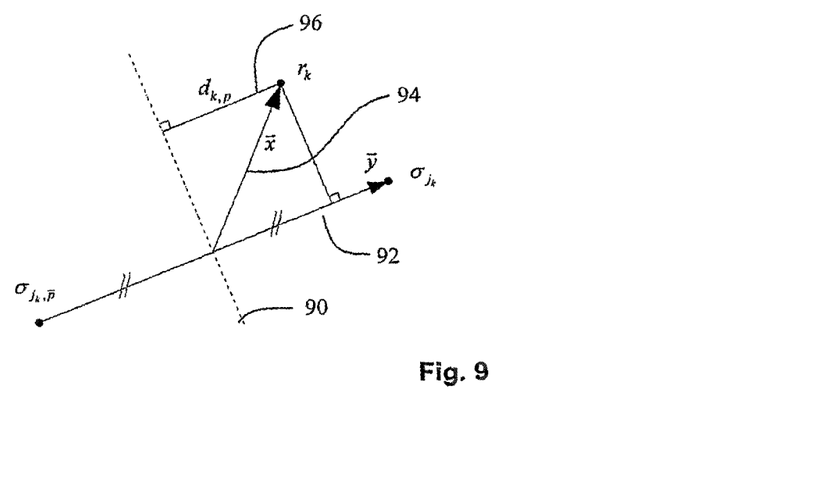
FIG. 9 is a diagram representing a geometrical relationship between the received sample $r_k$, symbols of a constellation diagram, and the calculated LLRs.

It is necessary to only calculate the real part of the a-coefficient and the b-coefficient for the first and second bit positions, reasoning along the I axis. The resulting coefficient table is illustrated in FIG. 9. The same coefficients can then be used for the third and fourth bit positions, reasoning along the Q axis.

By way of example, point 80 illustrates a received sample and with reference to which the operation of this embodiment of the invention will be described. The coefficient table of FIG. 8 will have been generated and stored prior to the reception of sample 80 (as described with reference to blocks 50 and 52 of FIG. 4). Then, the closest symbol $\sigma_{j_k}$ of the constellation to the received sample is determined (block 58 of FIG. 4). In this example, the closest symbol to sample 80 is $\sigma_6$. Therefore the a- and b-coefficients from the coefficient table of FIG. 8 corresponding to symbol $\sigma_6$ for the first and second bit positions are determined. In the representation of FIG. 8, the a- and b-coefficients are read from row 3 of the table. The log-likelihood ratios for each of the first two bits of symbol $\sigma_6$ are calculated according to equation (17) using the retrieved coefficients, and with reference to the received sample 80. Then the a- and b-coefficients from the coefficient table of FIG. 8 corresponding to symbol $\sigma_6$ for the third and fourth bit positions are determined. In the representation of FIG. 8, the a- and b-coefficients are read from row 4 of the table. The log-likelihood ratios for each of the last two bits of symbol $\sigma_6$ are calculated according to equation (17) using the retrieved coefficients with reference to the received sample 80.

In this embodiment noise variance is determined by the slicer 30 from a block of received samples $r_k$, as described above.

If the received sample is: $r_k = I + j \cdot Q$, then, reading the a- and b-coefficients from row 3 of the table in FIG. 8, the LLRs are calculated as follows along the I axis:

For the first bit:

$$\lambda_{4k+0} = \frac{\|g_k\|^2}{2 \cdot N_0} \cdot [\Re e(a_{6,0} \cdot r_k) + b_{4,0}] = \frac{\|g_k\|^2}{2 \cdot N_0} \cdot \left[-I \cdot 2\sqrt{\frac{2}{5}} - \frac{4}{5}\right]$$

For the second bit:

$$\lambda_{4k+1} = \frac{\|g_k\|^2}{2 \cdot N_0} \cdot [\Re e(a_{6,1} \cdot r_k) + b_{6,1}] = \frac{\|g_k\|^2}{2 \cdot N_0} \cdot \left[ I \cdot 2\sqrt{\frac{2}{5}} \right]$$

Then again, reading the a- and b-coefficients from row 4 of the table in FIG. 8, the LLRs are calculated as follows along the Q axis. Since we want to exchange the role of the I and Q axes, everything is as if we were replacing $r_k = I + j \cdot Q$ with $j \cdot r_k^* = Q + j \cdot I$.

For the third bit:

$$\lambda_{4k+2} = \frac{\|g_k\|^2}{2 \cdot N_0} \cdot [\Re e(a_{6,2} \cdot j \cdot r_k^*) + b_{6,2}] = \frac{\|g_k\|^2}{2 \cdot N_0} \cdot \left[ Q \cdot 2\sqrt{\frac{2}{5}} - \frac{4}{5} \right]$$

For the fourth bit:

$$\lambda_{4k+3} = \frac{\|g_k\|^2}{2 \cdot N_0} \cdot [\Re e(a_{6,3} \cdot j \cdot r_k^*) + b_{6,3}] = \frac{\|g_k\|^2}{2 \cdot N_0} \cdot \left[ Q \cdot 2\sqrt{\frac{2}{5}} \right]$$

In this case the symmetries have been exploited due to the fact that the constellation is separable: the coefficients for the first two bits are entirely determined by the position of the received sample along the I axis (the position along the Q axis is irrelevant); on the other hand the last two bits are entirely determined by the position of the received sample along the Q axis (the position along the I axis is irrelevant). Furthermore the same labelling convention has been chosen on the I and Q axes: going left to right for the first two bits or bottom to top for the last two bits, successive labels always read (0,1), (1,1), (1, 0) and (0, 0).

In a similar manner, symmetries in other constellation diagrams may be exploited to reduce the number of stored coefficients (or parts of coefficients).

Referring back to equations (17) and (18), the expression for the log-likelihood ratios is:

$$\lambda_{mk+p} = \frac{\|g_k\|^2}{2 \cdot N_0} \cdot (-1)^{\beta_{j_k},p} \cdot [2 \cdot \Re e(r_k \cdot (\sigma_{j_k} - \sigma_{j_k,\overline{p}})^*) + \|\sigma_{j_k,\overline{p}}\|^2 - \|\sigma_{j_k}\|^2]$$

This expression can be rewritten as:

$$\lambda_{mk+p} = \frac{\|g_k\|^2}{N_0} \cdot (-1)^{\beta_{j_k},p} \cdot \left\langle r_k - \frac{\sigma_{j_k} + \sigma_{j_k,\overline{p}}}{2} \,\bigg|\, \sigma_{j_k} - \sigma_{j_k,\overline{p}} \right\rangle \quad (20)$$

where $\langle .|. \rangle$ denotes the usual scalar product: $\langle u | v \rangle = \Re e(u \cdot v^*)$ FIG. 9 is a diagram representing the received sample $r_k$ and the estimated transmitted symbol determined by the slicer 24, $\sigma_{k_k}$. Line 92 joins symbol $\sigma_{j_k}$ and symbol $\sigma_{j_k,\overline{p}}$, the closest symbol in the constellation diagram having a complementary value for the bit at position p. Line 90 is constructed perpendicular to line 92 so that it intersects line 90 at the midpoint between symbols $\sigma_{j_k}$ and $\sigma_{j_k,\overline{p}}$. The intersection between lines 90 and 92 defines an origin from which two vectors $\vec{x}$ and $\vec{y}$ are defined so that:

$$\vec{x} = r_k - \frac{\sigma_{j_k} + \sigma_{j_k,\overline{p}}}{2} \quad (21)$$

$$\vec{y} = \sigma_{j_k} - \sigma_{j_k,\overline{p}} \quad (22)$$

Line 94 is the vector $\vec{x}$. Line 96 is the distance $d_{k,p}$ from $r_k$ to line 90 and is represented as:

$$d_{k,p} = \frac{|\langle \vec{x} | \vec{y} \rangle|}{\|\vec{y}\|} \quad (23)$$

As a consequence, the magnitude of the log-likelihood ratio can be expressed as:

$$|\lambda_{mk+p}| = \frac{\|g_k\|^2}{N_0} \cdot \|\sigma_{j_k} - \sigma_{j_k,\overline{p}}\| \cdot d_{k,p} \quad (24)$$

This provides an expression for the magnitude of the log-likelihood ratio, which can be seen as the distance $d_{k,p}$ from the received sample $r_k$ to the decision boundary (line 90) between symbols $\sigma_{j_k}$ and $\sigma_{j_k,\overline{p}}$, which is weighted by $\|\sigma_{j_k} - \sigma_{j_k,\overline{p}}\|$, the distance between symbols $\sigma_{j_k}$ and $\sigma_{j_k,\overline{p}}$ (which, it will be noted, only depends on the constellation geometry), further weighted by the instantaneous signal to noise ratio, which depends on the propagation gain:

$$\frac{\|g_k\|^2}{N_0} = 2 \cdot \|h_k\|^2 \cdot \frac{E_s}{N_0}$$

The invention claimed is:

1. A method for deriving a plurality of coefficients, said coefficients being for use in a calculation of log-likelihood ratios of bits of an estimated transmitted symbol of a predetermined constellation diagram, said constellation diagram being any one of a plurality of constellation diagrams, said method comprising the steps of:
   (a) for a bit of a symbol of said constellation diagram, determining, by a processor, a closest further symbol, wherein said further symbol has a complementary value for a corresponding bit; and
   (b) deriving, by the processor, said plurality of coefficients with reference to said symbol and said further symbol; and
   wherein a first coefficient, corresponding to said bit, of said plurality of coefficients is derived based on a complex difference between symbols and a second coefficient, corresponding to said bit, of the plurality of coefficients is derived based on a difference between respective energies of symbols.

2. The method according to claim 1 wherein step (a) is repeated for a plurality of bits of said symbol.

3. The method according to claim 1 wherein step (a) is repeated for a plurality of symbols of said constellation diagram.

4. The method according to claim 1 wherein step (b) comprises, for the bit of the symbol, deriving no more than said first and said second coefficients.

5. The method according to claim 4 wherein said first coefficient includes no more than a real part and an imaginary part and wherein said second coefficient includes no more than a real part.

6. The method according to claim 5 which includes the step of reducing a number of coefficients, or parts of coefficients, by considering symmetries in said constellation diagram.

7. The method according to claim 1 wherein step (a) is repeated for each bit of each symbol of said constellation diagram.

8. The method according to claim 1 wherein said further symbol is determined with reference to a Gray coding for said symbols of said constellation diagram.

9. The method according to claim 1 wherein said plurality of constellation diagrams each relate to a corresponding linear modulation scheme.

10. The method according to claim 9 wherein said coefficients include a first coefficient, $\sigma_{j_k}$ and a second coefficient, $\sigma_{j_k,\overline{p}}$ wherein said first and said second coefficients are calculated, for a $p^{th}$ bit of a $k^{th}$ symbol according to:

$$a_{j_k,p} = 2 \cdot (-1)^{\beta_{j_k,p}} \cdot (\sigma_{j_k} - \sigma_{j_k,\overline{p}})^*$$
$$b_{j_k,p} = (-1)^{\beta_{j_k,p}} \cdot [\|\sigma_{j_k,\overline{p}}\|^2 - \|\sigma_{j_k}\|^2]$$

where $\sigma_{j_k}$ is said $k^{th}$ symbol, $\sigma_{j_k,\overline{p}}$ is said further symbol and $\beta_{j_k,p}$ is a value of the $p^{th}$ bit of said symbol $\sigma_{j_k}$.

11. An apparatus configured to derive a plurality of coefficients, said coefficients being for use in a calculation of log-likelihood ratios of bits of an estimated transmitted symbol of a predetermined constellation diagram, said constellation diagram being any one of a plurality of constellation diagrams, said apparatus being configured to:
(a) for a bit of a symbol of said constellation diagram, determine a closest further symbol, wherein said further symbol has a complementary value for a corresponding bit; and
(b) derive said plurality of coefficients with reference to said symbol and said further symbol, wherein a first coefficient, corresponding to said bit, of the plurality of coefficients is derived based on a complex difference between symbols and a second coefficient, corresponding to said bit, of the plurality of coefficients is derived based on a difference between energies of symbols.

12. The apparatus according to claim 11 configured to repeat step (a) for a plurality of bits of said symbol.

13. The apparatus according to claim 11 configured to repeat step (a) for a plurality of symbols of said constellation diagram.

14. The apparatus according to claim 11 configured to derive, for the bit of the symbol, no more than said first and said second coefficient.

15. The apparatus according to claim 14 wherein said first coefficient includes no more than a real part and an imaginary part and wherein said second coefficient includes no more than a real part.

16. The apparatus according to claim 15 configured to reduce a number of coefficients, or parts of coefficients, by considering symmetries in said constellation diagram.

17. The apparatus according to claim 11 configured to repeat step (a) for each bit of each symbol of said constellation diagram.

18. The apparatus according to claim 11 configured to determine said further symbol with reference to a Gray coding for said symbols of said constellation diagram.

19. The apparatus according to claim 18 wherein said coefficients include a first coefficient, $a_{j_k,p}$ and a second coefficient, $b_{j_k,p}$, wherein said first and said second coefficients are calculated, for a $p^{th}$ bit of a $k^{th}$ symbol according to:

$$a_{j_k,p} = 2 \cdot (-1)^{\beta_{j_k,p}} \cdot (\sigma_{j_k} - \sigma_{j_k,\overline{p}})^*$$
$$b_{j_k,p} = (-1)^{\beta_{j_k,p}} \cdot [\|\sigma_{j_k,\overline{p}}\|^2 - \|\sigma_{j_k}\|^2]$$

where $\sigma_{j_k}$ is said $k^{th}$ symbol, $\sigma_{j_k,\overline{p}}$ is said further symbol and $\beta_{j_k,p}$ is a value of the $p^{th}$ bit of said symbol $\beta_{j_k,p}$.

20. The apparatus according to claim 11 configured to generate a plurality of sets of coefficients, each set of coefficients corresponding to one of said plurality of constellation diagrams, and storing each set in a corresponding store so that each store is associated with a corresponding constellation diagram.

21. A method for generating a log-likelihood ratio for a received sample derived from a received signal modulated according to a predetermined modulation scheme with a corresponding constellation diagram, which includes the steps of:
(a) finding an estimated transmitted symbol by estimating a closest symbol of said constellation diagram to said received sample;
(b) retrieving a plurality of coefficients, wherein said plurality of coefficients are retrieved with reference to said estimated closest symbol, wherein a first coefficient of said plurality of coefficients is retrieved based on a complex difference between symbols and a second coefficient of said plurality of coefficients is retrieved based on a difference between energies of symbols; and
(c) calculating the log-likelihood ratio on the basis of said plurality of retrieved coefficients.

22. The method according to claim 21 wherein said retrieved coefficients correspond to a bit of said estimated transmitted symbol.

23. The method according to claim 22 wherein steps (b) and (c) are performed for each bit of the estimated transmitted symbol.

24. The method according to claim 21 wherein said estimated transmitted symbol is determined by means of a hard decision.

25. The method according to claim 21 wherein step (a) is calculated with reference to the received sample.

26. The method according to claim 21 wherein step (a) includes the step of compensating for a propagation gain and/or an added noise.

27. The method according to claim 21 wherein step (b) includes the step of retrieving said one or more coefficients from a selected one of a plurality of tables of coefficients, said table being selected according to an association with said constellation diagram.

28. An apparatus configured to generate a log-likelihood ratio for a received sample derived from a received signal modulated according to a predetermined modulation scheme with a corresponding constellation diagram, said apparatus being configured to:
(a) find an estimated transmitted symbol by estimating a closest symbol of said constellation diagram to said received sample;

(b) retrieve a plurality of coefficients, wherein said plurality of coefficients are retrieved with reference to said estimated closest symbol, wherein a first coefficient of said plurality of coefficients is retrieved based on a complex difference between symbols and a second coefficient of said plurality of coefficients is retrieved based on a difference between energies of symbols; and (c) calculate the log-likelihood ratio on the basis of said one or more retrieved coefficients.

29. The apparatus according to claim 28 wherein said retrieved coefficients correspond to a bit of said estimated transmitted symbol.

30. The apparatus according to claim 29 configured to perform steps (b) and (c) for each bit of the estimated transmitted symbol.

31. The apparatus according to claim 28 configured to determine said estimated transmitted symbol by means of a hard decision.

32. The apparatus according to claim 28 configured to calculate step (a) with reference to the received sample.

33. The apparatus according to claim 8 configured to compensate for a propagation gain and/or an added noise.

34. The apparatus according to claim 28 configured to retrieve said one or more coefficients from a selected one of a plurality of tables of coefficients, said table being selected according to an association with said constellation diagram.

35. A method of calculating a log-likelihood ratio, by a processor, which includes deriving, by the processor, a first coefficient, $a_{j_k,p}$ and a second coefficient, $b_{j_k,p}$, wherein said first and said second coefficients are calculated, for a $p^{th}$ bit of a $k^{th}$ symbol according to:

$$a_{j_k,p} = 2 \cdot (-1)^{\beta_{j_k,p}} \cdot (\sigma_{j_k} - \sigma_{j_k,\overline{p}})^*$$

$$b_{j_k,p} = (-1)^{\beta_{j_k,p}} \cdot [\|\sigma_{j_k,\overline{p}}\|^2 - \|\sigma_{j_k}\|^2]$$

where $\sigma_{j_k}$ is said $k^{th}$ symbol, $\sigma_{j_k,\overline{p}}$ is said further symbol and $\beta_{j_k,p}$ is a value of the $p^{th}$ bit of said symbol $\sigma_{j_k}$, and wherein said log-likelihood ratio is calculated according to:

$$\lambda_{mk+p} = \frac{\|g_k\|^2}{2 \cdot N_0} \cdot [\Re e(a_{j_k,p} \cdot r_k) + b_{j_k,p}]$$

where $\lambda_{mk+p}$ is a log-likelihood ratio for a bit at position mk+p, $r_k$ is said received sample, $g_k$ is a complex channel gain and $N_0$ is a single-sided noise power spectral density.

36. A non-transitory computer readable medium comprising an executable computer program that, in response to execution by a computing apparatus, causes the computing apparatus to perform the method of claim 1.

37. A non-transitory computer readable medium comprising an executable computer program that, in response to execution by a computing apparatus, causes the computing apparatus to perform the method of claim 21.

38. A non-transitory computer readable medium comprising an executable computer program that, in response to execution by a computing apparatus, causes the computing apparatus to perform the method of claim 35.

* * * * *

UNITED STATES PATENT AND TRADEMARK OFFICE
CERTIFICATE OF CORRECTION

PATENT NO.      : 8,457,184 B2
APPLICATION NO. : 12/933080
DATED           : June 4, 2013
INVENTOR(S)     : Chappaz It is certified that error appears in the above-identified patent and that said Letters Patent is hereby corrected as shown below:

In the Specification

In Column 2, Line 28, delete "of," and insert -- of --, therefor.

In Column 3, Line 43, delete " $\beta_{k_k,p}$ " and insert -- $\beta_{j_k,p}$ --, therefor.

In Column 4, Line 36, delete " $b_{j_k,dp}$, " and insert -- $b_{j_k,p}$, --, therefor.

In Column 6, Line 3, delete "know" and insert -- known --, therefor.

In Column 7, Line 65, delete "(3), (5), (8)" and insert -- (3), (5), (8) --, therefor.

In Column 13, Line 47, delete " $+\|\sigma_{j_k,p}\| - \|\sigma_{j_k}\|^2]$, " and insert -- $+\|\sigma_{j_k,p}\|^2 - \|\sigma_{j_k}\|^2]$ --, therefor.

In Column 13, Line 60, delete "slicer 24," and insert -- slicer 30 --, therefor.

In Column 13, Line 61, delete " $\sigma_{k_k}.$ " and insert -- $\sigma_{j_k}.$ --, therefor.

In the Claims

In Column 15, Line 18, in Claim 10, delete " $\sigma_{j_k}$ " and insert -- $a_{j_k,p}$ --, therefor.

Signed and Sealed this
Third Day of December, 2013

Margaret A. Focarino
*Commissioner for Patents of the United States Patent and Trademark Office*

CERTIFICATE OF CORRECTION (continued)
U.S. Pat. No. 8,457,184 B2

In Column 15, Line 19, in Claim 10, delete "$\sigma_{j_k,\bar{p}}$" and insert --$b_{j_k,p}$,-- therefor.

In Column 16, Line 13, in Claim 19, delete "$\beta_{j_k,p}\cdot$" and insert --$\sigma_{j_k}\cdot$-- therefor.

In Column 17, Line 22, in Claim 33, delete "claim 8" and insert -- claim 28 -- therefor.